FIG. 1.

United States Patent Office 3,465,624
Patented Sept. 9, 1969

3,465,624
CONTROL SYSTEM FOR FILM CUTTER
Douglas L. Becker, Crestwood, Mo., assignor to Fox-Stanley Photo Products Inc., San Antonio, Tex., a corporation of Texas
Filed Aug. 24, 1967, Ser. No. 663,016
Int. Cl. B26d 3/00, 5/28, 7/00
U.S. Cl. 83—13
22 Claims

ABSTRACT OF THE DISCLOSURE

A film cutter receives an overall, continuous roll, that is made by splicing together a number of rolls which have indicia-bearing frames at the trailing ends thereof advances the film of that overall, continuous roll in step-by-step fashion, automatically severs equi-length sections from that overall, continuous roll until a light-sensitive element in that film cutter "sees" one of the light-opaque splices on one of the indicia-bearing frames, and then subsequently and automatically severs a further section which has a different length and which includes the indicia-bearing frame.

---

This invention relates to improvements in control systems for film cutters. More particularly, this invention relates to improvements in control systems which can enable film cutters to subdivide overall, continuous rolls into short, equi-length sections plus indicia-bearing sections of different length.

It is, therefore, an object of the present invention to provide an improved control system which can enable a film cutter to subdivide an overall, continuous roll into a number of short equi-length sections plus indicia-bearing sections of different length.

Some cameras require the operators thereof to rotate spindles, on which rolls of film are wound, to advance the unexposed frames of those rolls into register with the lenses of those cameras. Any roll of film exposed in such a camera will inevitably have unequal spacings between the adjacent frames thereof. However, at least one type of camera utilizes a film-advancing mechanism which provides substantially exact spacing between adjacent frames thereof; and the rolls of film which are exposed in that type of camera are customarily developed and printed individually and then cut into a number of equi-length sections which can be readily packaged with the prints made therefrom. It would be desirable to provide a control system for a film cutter which would permit a number of rolls of film, that were exposed in that type of camera, to be spliced together to form one overall, continuous roll for printing purposes, and which would subsequently enable that film cutter to automatically subdivide that overall, continuous roll into a number of short sections which could be packaged with the prints made therefrom. Indicia should be affixed to the various rolls of film which could key each roll of film to its owner; and the indicia on each roll of film should be packaged with the severed sections of that roll of film. The present invention provides such a control system; and it is, therefore, an object of the present invention to provide a control system for a film cutter which will permit a number of rolls of film to be spliced together to form one overall, continuous roll for printing purposes, which will permit keying indicia to be affixed to the various rolls of film, and which will subsequently enable that film cutter to subdivide that overall, continuous roll into a number of short sections which can be packaged with the prints made therefrom and which will enable the keying indicia for each roll of film to be packaged with the sections of that roll of film.

Each roll of film, that is to be spliced to other rolls of film to form the overall, continuous roll, will be pre-cut to a length which corresponds to the number of exposed frames on that roll of film plus one additional frame; and that additional frame will be located at the trailing end of that roll of film and will have a keying indicia affixed to it. The various pre-cut rolls of film will be spliced together by light-opaque splices to form an overall, continuous roll; and then that overall, continuous roll will be printed. Thereafter, that overall, continuous roll will be fed into the film cutter; and the control system of the present invention will cause that film cutter to automatically sever short, equi-length sections of film until a light-responsive element in that film cutter senses one of the light-opaque splices, and thereafter that control system will subsequently and automatically cause that film cutter to sever a section of film which has a different length and which includes the keying indicia. It is, therefore, an object of the present invention to provide a control system for a film cutter which enables that film cutter to receive pre-cut lengths of film that have been incorporated into an overall, continuous roll by light-opaque splices, to automatically sever a plurality of equi-length sections of film from that overall, continuous roll until a light-sensitive element in that film cutter "sees" one of those light-opaque splices, and to substantially and automatically sever a section which has a different length and which includes a keying indicia.

A roll of film, which is used in the type of camera that precisely advances each frame of each roll of film, usually has either twelve or twenty exposure-bearing frames; and even a twelve-exposure roll is so long that it would be desirable to subdivide that roll into a number of sections. One embodiment of the control system provided by the present invention causes the film cutter to automatically sever sections of film which have four frames thereon until a light-sensitive element in that film cutter "sees" a light-opaque splice, and then subsequently and automatically causes the film cutter to sever a section of film which has four exposure-bearing frames plus an indicia-bearing frame thereon. That embodiment of control system will enable the film cutter to automatically sever overall, continuous rolls which are made wholly from rolls of film which have twelve exposure-bearing frames, to automatically sever overall, continuous rolls which are made wholly from rolls of film which have twenty exposure-bearing frames, and to automatically sever overall, continuous rolls which are made from intermingled rolls of film which have twelve and twenty exposure-bearing frames. It is, therefore, an object of the present invention to provide a control system for a film cutter which can receive an overall, continuous roll and can cause that film cutter to sever four-frame sections of film until a light-sensitive element in that film cutter "sees" a light-opaque splice, and can then subsequently and automatically cause that film cutter to sever a five-frame section.

Other and further objects and advantages of the present invention should become apparent from an examination of the drawing and accompanying description.

In the drawing and accompanying description two preferred embodiments of the present invention are shown and described, but it is to be understood that the drawing and accompanying description are for the purpose of illustration only and do not limit the invention and that the invention will be defined by the appended claims.

Figure 1:
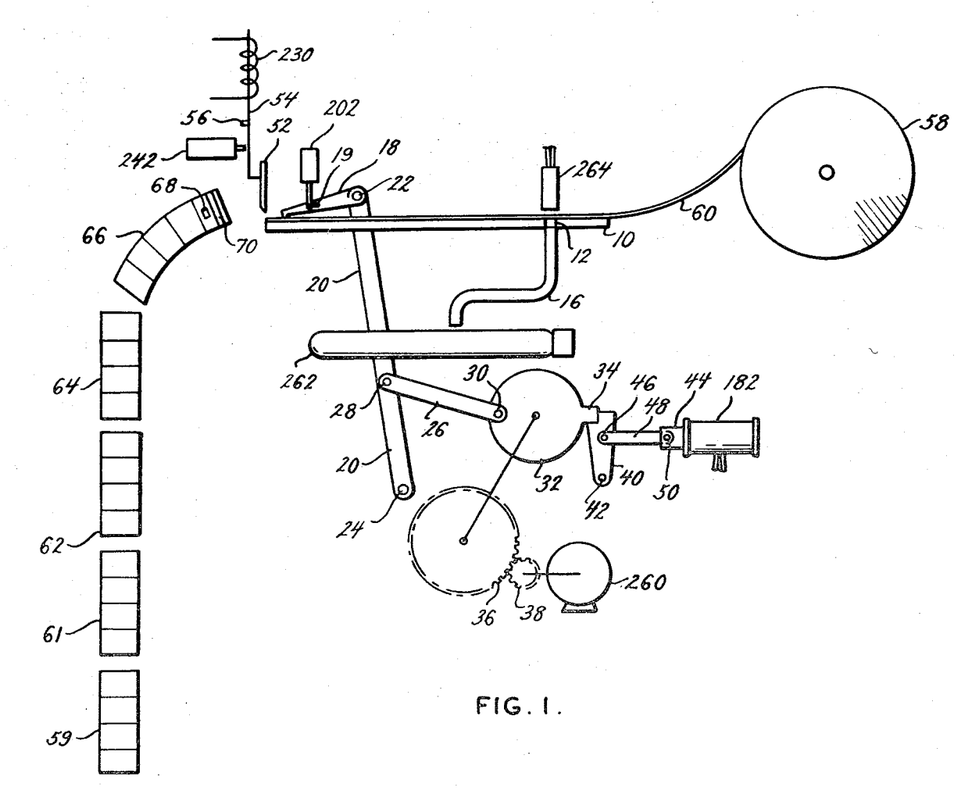
FIG. 1 is a diagrammatic showing of certain parts of a film cutter controlled by the control system of the present invention.

Referring to the drawing in detail, the numeral 10 denotes a translucent inspection plate over which film will be passed; and that inspection plate has an opening 12 therein. The numeral 16 denotes a length of transparent acrylic plastic material which has the upper end thereof in register with the opening 12 in the translucent inspection plate 10; and that length of transparent material will act as a "light-pipe." The numeral 18 denotes a pawl which is intended to advance film from right to left along the upper surface of the translucent inspection plate 10. That pawl has a pin 19 thereon; and the right-hand end of that pawl is secured to the upper end of a lever 20 by a pin 22. The lower end of that lever is held by a pivot 24; and a link 26 has one end thereof secured to that lever by a pin 28, and has the other end thereof secured to a clutch 32 by a pin 30. That clutch is a slip-type clutch; and it will remain stationary whenever the ear 34 thereon is intercepted and held by a dog 40 which rotates about a pivot 42. However, whenever that dog is out of the path of that ear, the clutch 32 will respond to power which is applied to it by a pinion 38 and a relatively large diameter gear 36 to rotate, and thus to drive the link 26. The dog 40 will normally be in the path of the ear 34 on the clutch 32, but it can be moved out of that path by a link 48 which is pinned to it by a pin 46 and which is pinned to the armature 44 of a solenoid by a pin 50.

The numeral 52 denotes a knife which is mounted adjacent the trailing end of the translucent inspection plate 10; and that knife can be moved to sever the film resting atop that transparent inspection plate. The knife 52 normally is disposed above the level of the film resting atop that translucent inspection plate; but it can be moved downwardly by a solenoid armature 54 to sever that film. That armature has a projection 56 thereon, as shown by FIG. 1.

The numeral 58 denotes a reel which can have a film 60 wound onto it; and that film will preferably be in the form of an overall, continuous roll which includes a number of pre-cut rolls of film that are spliced together by light-opaque splices. In the preferred embodiment of control system shown in FIG. 1, some of the pre-cut rolls of film will have twelve exposure-bearing frames plus a blank frame at the trailing ends thereof, while other of those pre-cut rolls of film will have twenty exposure-bearing frames plus a blank frame at the trailing ends thereof. The overall, continuous roll on the reel 58 could include only rolls of film which had twelve exposure-bearing frames plus a blank frame at the trailing ends thereof, or it could include only rolls of film which had twenty exposure-bearing frames plus a blank frame at the trailing ends thereof; but it will usually include randomly-intermingled rolls of film of both types. Each roll of film will have an indicia 68 affixed to the blank frame thereof; and that indicia will have a counterpart which will bear the name and address of the owner of that roll of film.

The numeral 59 denotes a section of film which has been severed from the film 60 by the knife 52, and which has four exposure-bearing frames. The numerals 61, 62, and 64 denote three further sections of film which have been severed from the film 60 by the knife 52; and each of those sections has four exposure-bearing frames. The numeral 66 denotes a section of film which has been severed from the film 60 by the knife 52; and that section has four exposure-bearing frames followed by a blank frame. The indicia 68 is affixed to that blank frame; and that indicia will usually be a sticker which is pressed into holding engagement with that blank frame. That blank frame will consist of the trailing end of a roll of film and the leading end of the next-succeeding roll of film which are held in abutting relation by a light-opaque splice 70; and that splice will remain on that blank frame. The sections 59, 61, 62, 64 and 66 constitute all of the sections of a twenty-exposure roll of film which has been pre-cut to have twenty exposure-bearing frames plus one indicia-bearing frame. If that roll of film had been a twelve-exposure roll of film, it would have been pre-cut to have twelve exposure-bearing frames plus one indicia-bearing frame; and it would have been subdivided into two four-frame sections and one five-frame section.

Figures 2, 3:
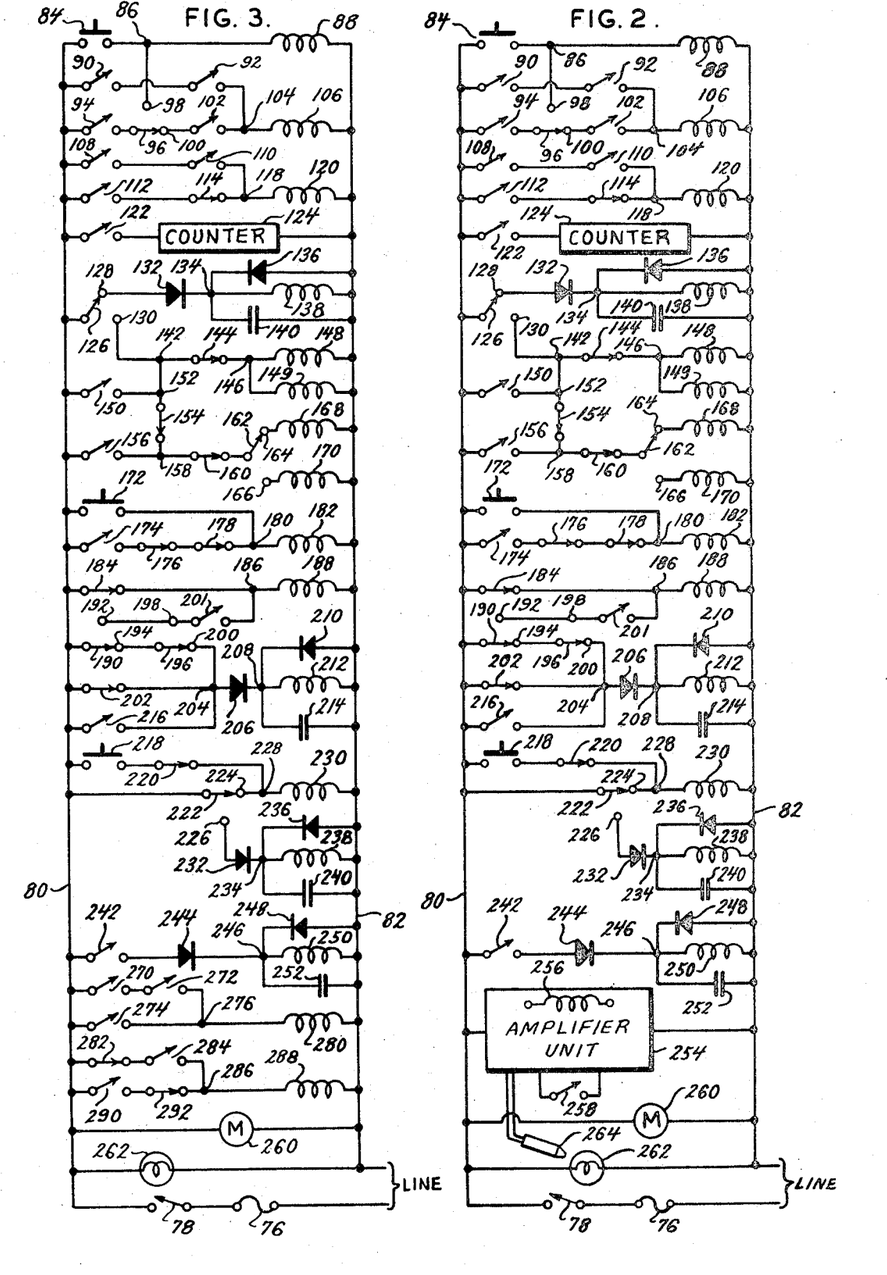
FIG. 2 is a circuit diagram of one preferred embodiment of control system that is made in accordance with the principles and teachings of the present invention.
FIG. 3 is a circuit diagram of a second preferred embodiment of control system that is made in accordance with the principles and teachings of the present invention.

The numeral 182 in FIG. 2 denotes a solenoid coil which can act through the solenoid armature 44 and the link 48 to pull the dog 40 out of the path of the ear 34 on the clutch 32, and thereby permit that clutch to effect reciprocation of the pawl 18. The pin 19 on the pawl 18 will engage the actuator of a single pole switch 202, and thereby hold that switch open, whenever that pawl is in the normal, at-rest position shown by FIG. 1. However, as that pawl moves to the right, the pin 19 will move out of engagement with that actuator and thereby permit that switch to close.

The numeral 230 denotes a solenoid coil which can act through the armature 54 to move the knife 52 downwardly to film-severing position. The numeral 242 denotes a single pole switch which has the actuator thereof mounted adjacent the path of the pin 56 on the armature 54; and that pin will momentarily open that switch as the armature 54 and the knife 52 move upwardly from film-severing position to their normal positions.

The numeral 260 denotes an electric motor which is connected to, and drives, the pinion 38. That motor will drive that pinion and the relatively-large gear 36 whenever it is energized—whether the pawl 40 is holding the ear 34 or is out of the path of that ear. However, whenever the dog 40 is holding the ear 34, the clutch 32 will merely slip, and will be unable to drive the link 26.

The numeral 262 denotes an electric lamp which is disposed below the level of, and which illuminates, the translucent inspection plate 10. The lower end of the "light pipe" 16 extends into close proximity with that lamp; and that light pipe will conduct light from that lamp to a light-sensitive element 264 which is mounted above the level of that translucent inspection plate and which is in register with the opening 12 in that translucent inspection plate.

The preferred embodiments of control system shown in FIG. 1 utilizes many of the components of a commercially-available film cutter which is made by the Byers Photo Equipment Company of Portland, Oreg., and which is identified as "Buyers Film Cutter Model 126." Thus, that control system uses the translucent inspection plate 10, the pawl 18, the lever 20, the link 26, the clutch 32, the pinion and gear 38 and 36, the dog 40, the solenoid armature 44, the link 48, the knife 52, the solenoid armature 54, the solenoid coil 182, the switch 202, the solenoid coil 230, the switch 242, the motor 260, the lamp 262, and other components plus the framework and housing of the film cutter. However, the manually-operated actuating switch of that film cutter has been removed, the opening 12 has been formed in the translucent inspection plate 10, and the "light pipe" 16 and the light-sensitive element 264 have been added. In addition, the components and circuitry of FIG. 2 have been added to convert that film cutter from a film cutter which responds to manual closing of a switch to advance and sever just one exposure-bearing frame to a film cutter that automatically advances and severs a number of equi-length, plural-frame sections and then subsequently severs a section which is of different length and which includes an indicia-bearing frame.

Referring to FIG. 2 in detail, the numerals 80 and 82 denote conductors which can be connected to a suitable source of alternating current. In the said preferred embodiment of the present invention, that source of alternating current will provide one hundred and fifteen volt, single phase, alternating current. The numeral 76 denotes an electric fuse; and the numeral 78 denotes a single pole, single throw ON-OFF, manually-operated switch. That fuse, that switch, and those conductors can supply power to the various electrical components which are shown in FIG. 2 and which bear numerals that increase from top to bottom in FIG. 2.

The numeral 84 denotes a normally-open push button which has one fixed contact thereof connected directly to the conductor 80 and which has the other fixed contact thereof connected to the conductor 82 by a junction 86 and a relay coil 88. That push-button switch will be located conveniently adjacent one hand of the operator of the control system shown in FIG. 2. The relay coil 88 controls normally-open relay contacts 122 which can connect a counter 124 to the conductors 80 and 82. That relay coil also controls normally-closed relay contacts 144 and normally-open relay contacts 258.

The numeral 106 denotes a relay coil which has the right-hand terminal thereof directly connected to the conductor 82; and that relay coil controls normally-open relay contacts 92 which are connected to the left-hand terminal of that relay coil by a junction 104. That relay coil also controls normally-open relay contacts 112 and 162–166 and normally-closed relay contacts 162–164.

The numeral 120 denotes a relay coil which has the right-hand terminal thereof directly connected to the conductor 82; and that relay coil controls relay contacts 110 which are connected to the left-hand terminal of that relay coil by a junction 118. That relay coil also controls normally-open relay contacts 96–98 and 156 and normally-closed relay contacts 96–100.

The numeral 138 denotes a relay coil which has the right-hand terminal thereof directly connected to the conductor 82; and that relay coil controls normally-closed relay contacts 160. The numeral 136 denotes a diode which has the anode thereof directly connected to the conductor 82 and which has the cathode thereof connected to a junction 134; and a diode 132 has the cathode thereof connected to that junction. A capacitor 140 is connected between that junction and the conductor 82, and thus in parallel with the relay coil 138; and that capacitor will coact with those diodes and that relay coil to make that relay coil a slow-to-release relay coil. In the preferred embodiment of control system shown in FIG. 2, the relay coil 138 will hold the normally-closed relay contacts 160 open for about two hundred milliseconds after that relay coil has been disconnected from the conductor 80.

The numeral 148 denotes a relay coil which has the right-hand terminal thereof directly connected to the conductor 82; and that relay coil controls normally-open relay contacts 90 and 108. The numeral 149 also denotes a relay coil which has the right-hand terminal thereof directly connected to the conductor 82; and that relay coil controls normally-open relay contacts 126–130 and 174 and normally-closed relay contacts 126–128 and 220. The left-hand terminals of the relay coils 148 and 149 are connected by a junction 146; and hence those relay coils are connected in parallel.

The numeral 150 denotes a foot switch that is directly connected to the conductor 80 and that normally is open. That foot switch will be located conveniently adjacent the foot of the operator of the conrtol system of FIG. 2; and that switch can be closed by a light foot pressure on it.

The numeral 168 denotes a relay coil which has the right-hand terminal thereof directly connected to the conductor 82; and that relay coil controls normally-open relay contacts 190–192 and normally-closed relay contacts 176 and 190–194. That relay coil is a slow-to-actuate relay coil; and it has a knob which can be shifted to adjust the length of time which will elapse between the instant that relay coil is connected between the conductors 80 and 82 and that relay coil opens the normally-closed relay contacts 176 and 190–194 and closes the normally-open relay contacts 190–192. In the preferred embodiment of control system shown in FIG. 2, that length of time will be about one and three-quarters seconds.

The numeral 170 denotes a relay coil which has the right-hand terminal thereof directly connected to the conductor 82; and that relay coil controls normally-open relay contacts 196–198 and normally-closed relay contacts 178 and 196–200. That relay coil is a slow-to-actuate relay coil; and it has a knob which can be shifted to adjust the length of time which will elapse between the instant that relay coil is connected between the conductors 80 and 82 and that relay coil opens the normally-closed relay contacts 178 and 196–200 and closes the normally-open relay contacts 196–198. In the preferred embodiment of control system shown in FIG. 2, that length of time will be about two and one quarter seconds.

The numeral 172 denotes a normally-open pushbutton switch that has one of the fixed contacts thereof directly connected to the conductor 80, and that has the other fixed contact thereof connected to the solenoid coil 182 by a junction 180. That pushbutton switch will be located conveniently adjacent the hand of the operator of the control system shown in FIG. 2.

The numeral 188 denotes a relay coil which has the right-hand terminal thereof directly connected to the conductor 82; and that relay coil controls normally-open relay contacts 201 and 216. The normally-open relay contacts 201 are connected to the left-hand terminal of that relay coil by a junction 186.

The numeral 212 denotes a relay coil which has the right-hand terminal thereof directly connected to the conductor 82; and that relay coil controls normally-open relay contacts 222–226 and normally-closed relay contacts 222–224. The numeral 210 denotes a diode which has the anode thereof directly connected to the conductor 82; and the cathode of that diode is connected to the cathode of a diode 206 by a junction 208. A capacitor 214 is connected between the junction 208 and the conductor 82, and thus in parallel with the relay coil 212; and that capacitor will coact with those diodes and that relay coil to make that relay coil a slow-to-release relay coil. In the preferred embodiment of control system shown in FIG. 2, the relay coil 212 will hold the normally-closed relay contacts 222–224 open and will hold the normally-open relay contacts 222–226 closed for about one hundred and twenty-five milliseconds after that relay coil has been disconnected from the conductor 80.

The numeral 218 denotes a normally-open pushbutton switch that has one of the fixed contacts thereof directly connected to the conductor 80, and which has the other fixed contact thereof connected to the solenoid coil 230 by relay contacts 220 and a junction 228. That pushbutton switch will be located conveniently adjacent the hand of the operator of the control system shown in FIG. 2.

The numeral 238 denotes a relay coil which has the right-hand terminal thereof directly connected to the conductor 82; and that relay coil controls normally-open relay contacts 114 and 184. The numeral 236 denotes a diode which has the anode thereof directly connected to the conductor 82; and the cathode of that diode is connected to the cathode of a diode 232 by a junction 234. The anode of the diode 232 is connected to the fixed relay contact 226. A capacitor 240 is connected between the junction 234 and the conductor 82, and thus in parallel with the relay coil 238; and that capacitor will coact with those diodes and that relay coil to make that relay coil a slow-to-release relay coil. In the preferred embodiment of control system shown in FIG. 2, the relay coil 238 will hold the normally-closed relay contacts 114 and 184 open for about two hundred milliseconds after the relay coil has been disconnected from the conductor 80.

The numeral 250 denotes a relay coil which has the right-hand terminal thereof directly connected to the conductor 82; and that relay coil controls normally-open relay contacts 94 and normally-closed relay contacts 154. The numeral 244 denotes a diode which has the anode thereof connected to the switch 242 and which has the cathode thereof connected to the cathode of a diode 248 by a junction 246. The anode of the latter diode is connected directly to the conductor 82. A capacitor 252 is connected between the junction 246 and the conductor 82; and thus in parallel with the relay coil 250; and that capacitor will coact with those diodes and that relay coil to make that relay coil a slow-to-release relay coil. In the preferred embodiment of control system shown in FIG. 2, the relay coil 250 will hold the normally-closed relay contacts 154 open and will hold the normally-open relay contacts 94 closed for about two hundred milliseconds after that relay coil has been disconnected from the conductor 80.

The numeral 254 denotes an amplifier unit which includes a relay coil 256; and that relay coil controls normally-open relay contacts 102. The light-sensitive element 264 is connected to the amplifier unit 254; and, as long as that light-sensitive element "sees" any appreciable amount of light from the "light pipe" 16, that amplifier unit will keep the relay coil 256 de-energized. However, whenever a light-opaque splice passes under the light-sensitive element, the amplifier unit 254 will energize the relay coil 256 and will keep that relay coil energized until that relay coil is re-set by closing of the relay contacts 258.

The numeral 142 denotes a junction between fixed relay contact 130 and relay contacts 144; and the numeral 152 denotes a junction between junction 142 and relay contacts 154. The numeral 158 denotes a junction between relay contacts 156 and relay contacts 160. The numeral 204 denotes a junction between the anode of diode 206 and fixed relay contact 200, switch 202, and relay contacts 216.

The relay coils 88, 106, 120, 148, 149, 188 and 256 will respond to the energization thereof to shift their relay contacts in about ten milliseconds. Those relay coils will respond to the de-energization thereof to permit those relay contacts to return to their normal positions in about the same length of time.

To operate the control system provided by the present invention, the operator will close the switch 78; and, thereupon, power will be supplied directly to the lamp 262, to the motor 260, and to the amplifier unit 254, but the relay coil 256 will remain de-energized. Power also will be supplied to the solenoid coil 230 via conductor 80, relay contacts 222-224, junction 228, and that solenoid coil to the conductor 82. Moreover, relay coil 212 will be energized via conductor 80, switch 202, junction 204, diode 206, junction 208, and that relay coil to the conductor 82; and also via conductor 80, relay contacts 190-194, relay contacts 196-200, junction 204, diode 206, junction 208, and that relay coil to the conductor 82. In addition, relay coil 188 will be energized via conductor 80, relay contacts 184, junction 186, and that relay coil to the conductor 82. Further, relay coil 138 will be energized via conductor 80, relay contacts 126-128, diode 132, junction 134 and the relay coil to the conductor 82.

As the relay coil 212 becomes energized, it will open the relay contacts 222-224; and, thereupon, the solenoid 230 will become de-energized. This means that the solenoid 230, which moved the knife 52 downwardly as the switch 78 was closed, will permit that knife to move back up to its normal position. As that knife moves back upwardly toward its normal position, the projection 56 on the armature 54 will momentarily close the switch 242; and, thereupon, current will flow from conductor 80 via that switch, diode 244, junction 246, and relay coil 250 to conductor 82. The resulting energization of that relay coil will cause relay contacts 94 to close, and will cause relay contacts 154 to open. Although the switch 242 will be closed only momentarily, the capacitor 252 will receive a charge which is large enough to keep the relay coil 250 energized for about two hundred milliseconds after that switch re-opens; and hence the relay contacts 94 will remain closed and the relay contacts 154 will remain open for about two hundred milliseconds after that switch re-opens. The closing of the relay contacts 94 will not be significant at this time because the relay contacts 102 are open; and the opening of the relay contacts 154 will not be significant at this time because relay contacts 126-130 are open, because the foot switch 150 is open, and because the relay contacts 156 are open.

Also, as relay coil 212 becomes energized, it will close the relay contacts 222-226; and, thereupon, current will flow from conductor 80 via relay contacts 222-226, diode 232, junction 234, and relay coil 238 to the conductor 82 to energize the latter relay coil. As the relay coil 188 becomes energized, the relay contacts 201 and 216 will close; but the closing of relay contacts 201 will not be significant at this time because the relay contacts 190-192 are open, and the closing of relay contacts 216 will not be significant at this time because the relay coil 212 is already energized. As the relay coil 138 becomes energized, it will open the relay contacts 160; but the opening of those contacts will not be significant at this time because the relay contacts 126-130 are open, because the foot switch 150 is open, and because the relay contacts 155 are open. As the relay coil 238 becomes energized, the relay contacts 114 and 184 will open. The opening of the relay contacts 114 will not be significant at this time because the relay contacts 112 are open; but the opening of the relay contacts 184 will de-energize the relay coil 188—with consequent re-opening of the contacts 201 and 216. All of this means that the relay coil 250 will become energized and will remain energized for about two hundred milliseconds and then become de-energized, the relay coils 138, 212 and 238 will become energized and will remain energized, and the solenoid coil 230 and the relay coil 188 will be energized only momentarily and will then again become de-energized.

In the event any other relay coil happens to become energized, because of transient currents, that relay coil will be de-energized by a momentary closing of the pushbutton switch 84. That momentary closing will momentarily energize the relay coil 88 via conductor 80, pushbutton switch 84, junction 86, and that relay coil to the conductor 82. During the momentary energization of that relay coil, the contacts 122 will close and actuate the counter 124, the relay contacts 144 will open and make certain that the relay coils 148 and 149 are de-energized, and the relay contacts 258 will close to make certain that the relay coil 256 within the relay and amplifier 254 has been de-energized. As the pushbutton switch 84 is released, the relay coil 88 will become de-energized and will permit the relay contacts 122, 144 and 258 to return to their normal positions. As the relay contacts 122 re-open, the operator should re-set the counter 124. The re-closing of the relay contacts 144 will not energize either of the relay coils 148 and 149; because the relay contacts 126-130 will be open, because the foot switch 150 will be open, and because the relay contacts 156 will be open. The relay coil 256 will remain de-energized as the relay contacts 258 re-open.

At this time, the operator will place the leading portion of the film 60 on the upper surface of the translucent inspection plate 10, and will advance the leading edge of that film until it is in register with the knife 52. That operator will then momentarily close the foot switch 150; and, thereupon, current will flow from conductor 80 via that switch, junctions 152 and 142, relay contacts 144, junction 146, and through both relay coils 148 and 149 to the conductor 82. The energization of relay coil 148 will close relay contacts 90 and 108; and the closing of relay contacts 90 will pre-set a holding circuit for the relay coil 106, and the closing of relay contacts 108 will pre-set a holding circuit for the relay coil 120. The energization of the relay coil 149 will open the relay contacts 126-128, will close the relay contacts 126-130, will close the relay contacts 174, and will open the relay contacts 220. The closing of the relay contacts 126-130 will establish a holding circuit for the relay coils 148 and 149 via conductor 80, relay contacts 126-130, junction 142, relay contacts 144, junction 146, and both of those relay coils to the conductor 82; and that holding circuit will keep those relay coils energized until such time as the operator again closes the pushbutton switch 84. The opening of the relay contacts 220 will provide a desirable safety factor, because it will keep any inadvertent closing of the pushbutton switch 218 from causing a premature and undesired actuation of the solenoid coil 230. As a result, the control system of the present invention will prevent any inadvertent severance of part or all of a frame of the film 60. The closing of the relay contacts 174 will energize the solenoid coil 182; and that solenoid coil will pull the dog 40 out of the path of the ear 34 on the clutch 32. Thereupon, the motor 260 will be able to start rotating the clutch 32; and that rotation will cause the link 26 to oscillate the lever 20 about the pivot 24. The resulting oscillatory movement of the pin 22 at the upper end of that lever will force the pawl 18 to reciprocate relative to the translucent inspection plate 10. As that pawl moves to the right, the free end thereof will automatically raise upwardly and slide over the sprocket-receiving openings at the edge of the film 60; but, as that pawl is moved to the left, that free end will automatically enter one of those openings and then drive the film 60 from right to left in FIG. 1. Each revolution of the clutch 32 will effect one reciprocation of the pawl 18; and each reciprocation of that pawl will advance the film 60 a distance equal to one exposure-bearing frame thereon. At the end of each advancement of the film 60, the pin 19 on the pawl 18 will engage the actuator for the switch 202 and thereby open that switch. That opening of that switch will not be significant as long as the relay contacts 190–194 remain closed, because those relay contacts are connected in parallel with the switch 202 and will continue to keep the relay coil 212 energized.

The opening of the relay contacts 126–128 will disconnect the relay coil 138 from the conductor 80; but that relay coil will continue to remain energized for a period of about two hundred milliseconds, because the capacitor 140 will discharge through that relay coil and will cause sufficient current to flow through that relay coil to keep the relay contacts 160 open for that length of time. At the end of the two hundred milliseconds period, the relay coil 138 will become de-energized to re-close relay contacts 160 and thereby connect the relay coil 168 to the conductor 80 via relay contacts 126–130, junctions 142 and 152, relay contacts 154, junction 158, relay contacts 160, and relay contacts 162–164. That relay coil will not immediately become sufficiently energized to shift the positions of the relay contacts 176, 190–192 and 190–194; and hence the relay contacts 176, will continue to remain closed, the relay contacts 190–192 will continue to remain open, and the relay contacts 190–194 will continue to remain closed for about one and three-quarters seconds.

During the period of about two hundred milliseconds when the current from the discharging capacitor 140 keeps the relay coil 138 energized, and during the further period of about one and three-quarter seconds when the relay coil 168 is becoming energized, the motor 260 will continuously reciprocate the pawl 18 to effect repeated advancements of the film 60. After that pawl has completed more than three full advancements of that film, but before that pawl can complete a fourth full advancement of that film, the relay coil 168 will become sufficiently energized to open the relay contacts 176, to close the relay contacts 190–192, and to open the relay contacts 190–194. The opening of the relay contacts 176 will de-energize the solenoid coil 182, and that solenoid coil will permit the dog 40 to move back into the path of the ear 34 on the clutch 32; but that dog will not be able to halt rotation of that clutch until the ear 34 again engages that dog. This means that the clutch 32 will continue to drive the pawl 18 until that pawl completes a fourth advancement of the film 60; and, as that pawl completes that fourth advancement, it will re-open the switch 202 and then come to rest.

The closing of the relay contacts 190–192 will pre-set a holding circuit for the relay coil 188; and the opening of the relay contacts 190–194 will leave the switch 202 as the sole current-supplying element for the relay coil 212. This means that when the pawl 18 does complete the fourth advancement of the film 60 and opens the switch 202, the relay coil 212 will become disconnected from the conductor 80.

As the relay coil 212 is disconnected from the conductor 80, the capacitor 214 will discharge through that relay coil and thereby keep that relay coil energized for about one hundred and twenty-five milliseconds. The resulting time delay is desirable; because it will enable the pawl 18 and the film 60 to become completely stationary before the relay contacts 222–224 and 222–226, which are controlled by the relay coil 212, can shift their positions. As the relay contacts 222–224 then re-close, the solenoid coil 230 will again become energized via conductor 80, relay contacts 222–224, junction 228, and that solenoid coil to the conductor 82; and that solenoid coil will move the knife 52 downwardly to sever the section 59 of film. Because the pawl 18 provided four full advancements of the film 60 before it came to rest, the section 59 will have a length equal to four frames.

The re-opening of the relay contacts 222–226 will disconnect the relay coil 238 from the conductor 80; but the capacitor 240 will discharge through that relay coil and thereby keep that relay coil energized for about two hundred milliseconds. As the value of the current flowing from capacitor 240 through the relay coil 238 becomes small enough, the contacts 114 and 184 will be permitted to re-close. The re-closing of relay contacts 114 will not be significant at this time, because the relay contacts 112 are open; but the re-closing of relay contacts 184 will energize the relay coil 188. Thereupon, the relay contacts 201 will close to complete a holding circuit for that relay coil via conductor 80, relay contacts 190–192, relay contact 198, relay contacts 201, junction 186, and that relay coil to the conductor 82. The closing of the relay contacts 216 will re-energize the relay coil 212 via conductor 80, those relay contacts, junction 204, diode 206, junction 208, and that relay coil to the conductor 82.

The re-energization of relay coil 212 will re-open relay contacts 222–224 and will re-close relay contacts 222–226. The re-opening of relay contacts 222–224 will de-energize the solenoid coil 230; and, thereupon, that solenoid coil will permit the knife 52 to move back up out of the path of the film 60 resting upon the translucent inspection plate 10. The two hundred millisecond delay in the de-energization of relay coil 238 is desirable, because it correspondingly delays the energization of relay coil 188 and also correspondingly delays the energization of relay coil 212. The overall result is that the delayed de-energization of the relay coil 238 will give the solenoid coil 230 sufficient time to cause the knife 52 to sever the section 59 from the rest of the film 60.

The re-closing of relay contacts 222–226, as relay coil 212 again becomes energized, will re-energize relay coil 238 via conductor 80, those relay contacts, diode 232, junction 234, and the latter relay coil to the conductor 82; and hence relay contacts 114 and 184 will re-open. The re-opening of the relay contacts 114 will not be significant at this time because the relay contacts 112 are open; and the re-opening of the relay contacts 184 will not be significant at this time because the relay contacts 190–192 and the relay contacts 201 will be holding relay coil 188 energized.

As the knife 52 moves back up to its normal, raised position, the projection 56 on the armature 54 operated by the solenoid coil 230 will cause the switch 242 to close momentarily and then re-open. As that switch closes, current will flow from conductor 80 via that switch, diode 244, junction 246, and relay coil 250 to conductor 82; and the resulting energization of that relay coil will cause relay contacts 94 to close, and will cause relay contacts 154 to open. Although the switch 242 will be closed only momentarily, the capacitor 252 will receive a charge which is large enough to keep the relay coil 250 energized for about two hundred milliseconds after that switch re-opens; and hence the relay contacts 94 will remain closed and the relay contacts 154 will remain open for about two hundred milliseconds after that switch re-opens.

The closing of the relay contacts 94 will not be significant at this time because the relay contacts 102 are open; but the opening of the relay contacts 154 will de-energize the relay coil 168. The consequent re-closing of relay contacts 176 will re-energize the solenoid coil 182; and that solenoid coil will pull the dog 40 out of the path of the ear 34 on the clutch 32, and will thereby enable the motor 260 to cause the pawl 18 to initiate further advancements of the film 60. The opening of relay contacts 190–192 will de-energize relay coil 188, and the closing of relay contacts 190–194 will provide a holding circuit for the relay coil 212.

The de-energization of relay coil 188 will permit the relay contacts 201 and 216 to re-open; but the re-opening of relay contacts 201 will not be significant at this time because the relay coil 188 has already been de-energized, and the re-opening of relay contacts 216 will not be significant at this time because the relay contacts 190–194 and 196–200 will be closed and will be keeping relay coil 212 energized. All of this means that the solenoid coil 182 will remain energized and will permit the motor to continue to drive the pawl 18—thereby effecting further advancements of the film 60.

About two hundred milliseconds after the knife-operated switch 242 re-opens, the value of the current which the capacitor 252 causes to flow through the relay coil 250 will become so small that the relay contacts 94 will re-open and the relay contacts 154 will re-close. The re-opening of the relay contacts 94 will not be significant at this time because the relay contacts 102 are open; but the re-closing of the relay contacts 154 will connect the relay coil 168 to the conductor 80 by relay contacts 126–130, junctions 142–152, relay contacts 154, junction 158, relay contacts 160, and relay contacts 162–164. As pointed out hereinbefore, that relay coil will not immediately become sufficiently energized to shift the positions of the relay contacts 176, 190–192 and 190–194; and hence the relay contacts 176 will continue to remain closed, the relay contacts 190–192 will continue to remain open, and the relay contacts 190–194 will continue to remain closed for about one and three-quarters seconds. During the approximately two hundred milliseconds when the current from the discharging capacitor 252 keeps the relay coil 250 energized, and during the further period of about one and three-quarters seconds when the relay coil 168 is becoming energized sufficiently to shift the positions of the relay contacts 176, 190–192 and 190–194, the motor 260 will continuously reciprocate the pawl 18 to effect advancements of the film 60. After that pawl has completed more than three full advancements of that film, but before that pawl can complete a fourth full advancement of that film, the relay coil 168 will become sufficiently energized to open the relay contacts 176, to close the relay contacts 190–192, and to open the relay contacts 190–194. As pointed out hereinbefore, the opening of the relay contacts 176 will de-energize the solenoid coil 182 and permit the dog 40 to move back into the path of the ear 34 on the clutch 32; but that dog will not be able to halt rotation of that clutch until that ear again engages that dog. As a result, the clutch 32 will enable the motor 260 to continue to drive the pawl 18 until that pawl completes a fourth advancement of the film 60; and, as that pawl completes that fourth advancement, it will re-open the switch 202 and then come to rest. Also, as pointed out hereinbefore, the re-opening of switch 202 will disconnect relay coil 212 from the conductor 80; and that relay coil will, after a delay of about one hundred and twenty-five milliseconds, connect the knife solenoid 230 between the conductors 80 and 82—with a consequent severance of section 61 from the film 60. Moreover, as pointed out hereinbefore, the relay coil 238 will be disconnected from the conductor 80; and, after a delay of about two hundred milliseconds, that relay coil will become de-energized and will cause the relay coil 188 to be connected across the conductors 80 and 82. Further, as pointed out hereinbefore, the energization of relay coil 188 wil re-energize the relay coil 212—with a consequent de-energization of the solenoid coil 230 and with a consequent re-energization of the relay coil 238. In addition, as pointed out hereinbefore, the projection 56 on the armature 54 will momentarily close the switch 242.

All of this means that the control system of FIG. 2 will have initiated and completed two energization cycles of the solenoid coils 182 and 230; and those energization cycles will have effected the advancement and severance of the sections 59 and 61 of the film 60. The first energization cycle of those solenoid coils was initiated by actuation of the foot switch 150; but the second energization cycle of those solenoid coils was automatically initiated by the de-energization of the relay coil 168 as the knife-operated switch 242 closed momentarily to energize the relay coil 250 and thus open the relay contacts 154.

The control system of FIG. 2 will automatically initiate further energizations of the solenoid coils 182 and 230— to provide further four-frame advancements of the film 60 and to provide further severances of four-frame lengths of film—as long as the light-sensitive element 264 does not "see" a light-opaque splice. That light-sensitive element may "see" some badly over-exposed frames; but enough light will be able to pass through such frames to keep that light-sensitive element from actuating the relay and amplifier 254. If the portion of the film 60 which overlies the translucent inspection plate 10 consists of a twenty-exposure roll, the control system of FIG. 2 will initiate and complete three energization cycles of the solenoid coils 182 and 230, and will then initiate a fourth energization cycle of the solenoid coil 182 before the light-sensitive element 264 "sees" a light-opaque splice.

The light-sensitive element 264 will "see" a light-opaque splice during the fourth energization cycle of the solenoid coil 182; but it will not see that splice until after the value of the current which the capacitor 252 supplies to the relay coil 250 has fallen to a level at which the relay contacts 94 can re-open and the relay contacts 154 can re-close. This means that the light-sensitive element 264 will see a light-opaque splice during the period when the relay contacts 94 have re-opened, and the relay coil 168 has been connected to the conductor 80 by relay contacts 126–130, junctions 142 and 152, relay contacts 154, junction 158, relay contacts 160, and relay contacts 162–164 but has not yet become sufficiently energized to shift the relay contacts 176, 190–192 and 190–194. As that light-sensitive element sees that splice, it will cause the amplifier unit 254 to energize the relay coil 256; and that amplifier unit will then keep that relay coil energized until such time as the operator presses the pushbutton switch 84 to cause the relay contacts 258 to close and re-set that relay coil. This means that the width of the splice is not significant; and any light-opaque splice which is wide enough to effectively splice the trailing end of one roll of film to the leading end of the next-succeeding roll of film can be used.

The energization of the relay coil 256 will close the relay contacts 102; but the closing of those relay contacts will not energize the relay coil 106 because the relay contacts 94 will be open. As a result, the control system of FIG. 2 will, for a period of time, continue to operate in the same way it operated during the first three energization cycles of the solenoid coils 182 and 230. Specifically, the solenoid coil 182 will become de-energized as the relay coil 168 becomes sufficiently energized to open the relay contacts 176; but the motor 260 will continue to drive the pawl 18 until that pawl has completed the fourth advancement of the film 60. As that pawl completes that fourth advancement of that film, it will again open the switch 202—thereby again disconnecting relay coil 212 from conductor 80; and that relay coil will, after a delay of about one hundred and twenty-five milliseconds, again permit relay contacts 222–224 to energize the knife-actuating solenoid coil 230 to cause the knife 52 to move downwardly and sever the section 64 from the film 60. The relay coil 238 was disconnected from the conductor 80 by the re-opening of relay contacts 222–226 as the relay coil 212 became de-energized; and, after a delay of about two hundred milliseconds, the former relay coil will become unable to keep its relay contacts from returning to their normal positions. At such time the relay coil 188 and then the relay coil 212 will be re-energized. The relay coil 238 will become re-energized, and the solenoid coil 230 will become de-energized, as the relay coil 212 becomes energized and closes relay contacts 222–226 and opens relay contacts 222–224; and, as the knife 52 moves back upwardly and momentarily closes the switch 242, the relay coil 250 will again become energized and will again close relay contacts 94 and open relay contacts 154. The opening of relay contacts 154 will again de-energize the relay coil 168; but the closing of relay contacts 94 will energize the relay coil 106 via conductor 80, relay contacts 94, relay contacts 96–100, relay contacts 102, junction 104, and that relay coil to the conductor 82. As the relay coil 106 becomes energized, it will close relay contacts 92, 112 and 162–166 and will open relay contacts 162–164. The closing of relay contacts 92 will establish a holding circuit for the relay coil 106, the closing of relay contacts 112 will pre-set the energization circuit for the relay coil 120, the opening of relay contacts 162–164 will prevent re-energization of the relay coil 168, and the closing of relay contacts 162–166 will pre-set the energization circuit for the relay coil 170. The de-energization of the relay coil 168, as the relay contacts 154 re-opened when relay coil 250 became de-energized, re-closed the relay contacts 176 and thus re-energized the solenoid coil 182; thereby initiating a fifth energization cycle of that solenoid coil. That de-energization of relay coil 168 also opened relay contacts 190–192, thereby de-energizing relay coil 188, and additionally closed relay contacts 190–194, thereby keeping relay coil 212 energized via conductor 80, relay contacts 190–194, relay contacts 196–200, junction 204, diode 206, junction 208, and that relay coil to the conductor 82. As relay coil 188 became de-energized, relay contacts 201 and 216 re-opened; but the re-opening of those relay contacts was not significant at that time.

The control circuit of FIG. 2 will enable the motor 260 to continue to reciprocate the pawl 18 during the two hundred millisecond period when the capacitor 252 is causing sufficient current to flow through the relay coil 250 to hold the relay contacts 94 closed and to hold the relay contacts 154 open. Further, that motor will continue to reciprocate that pawl after the relay coil 250 has become de-energized and has permitted relay contacts 94 to re-open and relay contacts 154 to re-close; because the re-opening of relay contacts 94 can not affect the holding circuit for relay coil 106 which includes the relay contacts 90 and 92 and junction 104, and because the relay coil 170 will not shift its relay contacts for about two and one-quarter seconds after that relay coil is connected to the conductor 80 at the time the relay contacts 154 re-close. This means that relay coil 170 will not become sufficiently energized to shift its relay contacts until after the pawl 18 has completed a fourth advancement of the film 60 and has initiated a fifth advancement of that film.

As the relay coil 170 does become energized, the relay contacts 178 will open to de-energize the solenoid coil 182; and that solenoid coil will again permit the dog 40 to move into the path of the ear 34 on the clutch 32. However, that clutch will permit the motor 260 to continue to drive the pawl 18 until that pawl completes the fifth advancement of the film 60; and that pawl will re-open the switch 202 and will come to rest as it completes that fifth advancement. The opening of the relay contacts 196–200, as the relay coil 170 becomes energized, will leave the switch 202 as the sole current-supplying element for the relay coil 212; and hence, when that switch opens as the pawl 18 completes its fifth advancement, the latter relay coil will be disconnected from the conductor 80. However, the capacitor 214 will discharge through that relay coil and will cause sufficient current to flow through that relay coil for about one hundred and twenty-five milliseconds to keep the relay contacts controlled by that relay coil from shifting. The closing of the relay contacts 196–198, as the relay coil 170 becomes energized, will pre-set a holding circuit for the relay coil 188.

The re-closing of the relay contacts 222–224, as the relay coil 212 becomes de-energized, will energize the solenoid coil 230 and will cause the knife 52 to move downwardly and sever the section 66 of the film 60. That section will not only include four exposure-bearing frames but will also include a fifth frame that is blank and that has the indicia 68 and the light-opaque splice 70 thereon. That section plus the previously-severed sections 59, 61, 62 and 64 will be packaged with the prints made therefrom and will be held for the owner thereof.

The opening of the relay contacts 222–226, as the relay coil 212 becomes de-energized, will disconnect the relay coil 238 from the conductor 80; and, after a delay of about two hundred milliseconds, that relay coil will permit the relay contacts 114 and 184 to re-close. The re-closing of the relay contacts 114 will energize the relay coil 120 via conductor 80, relay contacts 112, relay contacts 114, junction 118, and that relay coil to the conductor 82; and the re-closing of relay contacts 184 will energize relay coil 188 via conductor 80, those relay contacts, junction 186, and that relay coil to the conductor 82.

The energization of relay coil 120 will close relay contacts 96–98, 110 and 156 and will open relay contacts 96–100. The opening of relay contacts 96–100 will not be significant at this time, because the relay coil 106 will be kept energized by the relay contacts 90 and 92; but the closing of relay contacts 96–98 will pre-set an energizing circuit for the relay coil 88. The closing of relay contacts 110 will establish a holding circuit for the relay coil 120 via conductor 80, relay contacts 108, relay contacts 110, junction 118, and that relay coil to the conductor 82; and the closing of relay contacts 156 will establish a holding circuit for relay coil 170 via conductor 80, those relay contacts, junction 158, relay contacts 160, relay contacts 162–166, and that relay coil to the conductor 82.

The energization of the relay coil 188, as relay coil 238 became de-energized and permitted the relay contacts 184 to re-close, will close relay contacts 201 and 216. The closing of relay contacts 201 will establish a holding circuit for relay coil 188 via conductor 80, relay contacts 190–194, relay contacts 196–198, relay contacts 201, junction 186, and that relay coil to the conductor 82. The closing of relay contacts 216 will energize relay coil 212 via conductor 80, relay contacts 216, junction 204, diodes 206, junction 208, and that relay coil to the conductor 212. The resulting opening of relay contacts 222–224 will de-energize the solenoid coil 230; and the closing of relay contacts 222–226 will energize the relay coil 238. The relay contacts 114 and 184 will open as the relay coil 238 becomes energized; but the opening of relay contacts 114 will not be significant at this time because the relay coil 120 will be kept energized by the holding circuit which includes relay contacts 108 and 110, and the opening of relay contacts 184 will not be significant at this time because relay coil 118 will be kept energized by the holding circuit which includes relay contacts 190–194, relay contacts 196–198, relay contacts 201, and junction 186.

The knife 52 will move upwardly as the solenoid coil 230 becomes de-energized; and the consequent momentary closing of switch 242 will re-energize the relay coil 250. The resulting opening of relay contacts 154 will not be significant at this time, because the relay coil 170 will be kept energized by the holding circuit which includes relay contacts 156, junction 158, relay contacts 160, and relay contacts 162–166. The closing of relay contacts 94, as the relay coil 250 becomes energized, will energize relay coil 88 via conductor 80, those relay contacts, relay contacts 96–98, junction 86, and that relay coil to the conductor 82; and that relay coil will close relay contacts 122 and 258 and will open relay contacts 144. The closing of relay contacts 122 will actuate the counter 124, the closing of relay contacts 258 will de-energize relay coil 256, and the opening of relay contacts 144 will de-energize relay coils 148 and 149.

The de-energization of relay coil 256 will permit relay contacts 102 to re-open; but the re-opening of those relay contacts will not be significant at this time because the relay coil 106 will be kept energized by the holding circuit which includes relay contacts 90 and 92 and junction 104. However, the re-opening of relay contacts 90, which occurs promptly thereafter as the relay coil 148 is de-energized, will interrupt that holding circuit and will permit the relay coil 106 to become de-energized. The opening of relay contacts 108, as the relay coil 148 is de-energized, will interrupt the holding circuit for the relay coil 120, and thus will permit that relay coil to become de-energized. The re-closing of relay contacts 126–128, as the relay coil 149 becomes de-energized, will energize relay coil 138; and the re-opening of relay contacts 126–130 will de-energize the relay coil 170. The opening of relay contacts 174, as the relay coil 149 becomes de-energized, will keep the solenoid coil 182 de-energized — even though relay contacts 178 will re-close as the relay coil 170 becomes de-energized. The re-closing of relay contacts 220, as the relay coil 149 becomes de-energized, will pre-set the circuit to the knife-actuating solenoid coil 230 which will enable the operator to close the pushbutton switch 218 and effect actuation of that solenoid coil — in the event it becomes desirable for that operator to actuate the knife 52.

The de-energization of the relay coil 106 will re-open relay contacts 92, 112 and 162–166 and will re-close relay contacts 162–164. The re-opening of relay contacts 92 will not be significant at this time because relay coil 106 has already been de-energized; and the re-opening of relay contacts 112 will not be significant at this time because relay coil 120 has already been de-energized. The re-opening of relay contacts 162–166 and the re-closing of relay contacts 162–164 will not be significant at this time because relay contacts 126–130, foot switch 150, and relay contacts 156 are all open.

The re-opening of the relay contacts 96–98, as relay coil 120 becomes de-energized, will de-energize the relay coil 88; but the re-opening of relay contacts 110 will not be significant at this time because relay coil 120 has already been de-energized. The re-closing of relay contacts 96–100, as the relay coil 120 becomes de-energized, will not be significant at this time because the relay contacts 102 are open. The re-opening of the relay contacts 156 will make certain that the relay coils 168 and 170 are de-energized.

The energization of relay coil 138, as the relay coil 149 becomes de-energized and permits relay contacts 126–128 to re-close, will open relay contacts 160. However, the opening of those relay contacts will not be significant at this time because the relay coils 168 and 170 are already de-energized. As the relay coil 170 became de-energized, relay contacts 178 and 196–200 re-closed and relay contacts 196–198 re-opened. As pointed out hereinbefore, the re-closing of the relay contacts 178 was not significant, because the relay contacts 174 were keeping the solenoid coil 182 de-energized; but the re-closing of relay contacts 196–200 kept relay coil 212 energized via relay contacts 190–194, relay contacts 196–200, junction 204, diode 206, and junction 208. The re-opening of relay contacts 196–198, as the relay coil 170 became de-energized, de-energized the relay coil 188.

The re-opening of the relay contacts 122, as the relay coil 88 becomes de-energized, will disconnect the counter 124 from the conductor 80; but that counter will retain the count registered thereon. The re-opening of relay contacts 258, as the relay coil 88 becomes de-energized, will not be significant at this time because the relay coil 256 will remain de-energized. The re-closing of the relay contacts 144, as the relay coil 88 becomes de-energized, will not be significant at this time; because the relay contacts 126–130, the relay contacts 156, and the foot switch 150 are all open.

The re-opening of the relay contacts 201, and the relay coil 188 becomes de-energized, will not be significant at this time, because that relay coil has already been de-energized. The re-opening of the relay contacts 216 will not be significant at this time, because relay contacts 190–194 and 196–200 will be keeping the relay coil 212 energized. If the relay coil 250 has not previously become de-energized, it will do so now; and, thereupon, relay contacts 94 will re-open and relay contacts 154 will re-close.

All of this means that the control system of FIG. 2 responded to an actuation of the foot switch 150 to automatically advance and sever the four-frame sections 59, 61, 62 and 64 of the film 60, to automatically advance the sever the five-frame section 66 of that film, and then to automatically come to rest. In its position of rest, the relay coils 88, 106, 120, 148, 149, 168, 170, 188, 250 and 256 will be de-energized and the relay coils 138, 212 and 238 will be energized. To effect the advancement and severance of further sections of the film 60 the operator need only press the foot switch 150 again.

If the next portion of the film 60 is a twelve-exposure roll rather than a twenty-exposure roll, the light-sensitive element 264 will "see" a light-opaque splice after the solenoid coil 182 and 230 have initiated and completed a full energization cycle and solenoid coil 182 has initiated but not completed a second energization cycle. That light-sensitive element will "see" that splice after the relay coil 250 has become de-energized but before the relay coil 168 has become energized sufficiently to shift the relay contacts 176, 190–192 and 190–194.

As that light-sensitive element "sees" that splice, it will cause the amplifier unit 254 to energize the relay coil 256. Relay coil 168 will, about one and three-quarters seconds after it is energized, become de-energized, solenoid coil 182 will become de-energized, motor 260 will drive the pawl 18 until that pawl completes its fourth advancement and opens switch 202 as it comes to rest, relay coil 212 will be disconnected from conductor 80, after about one hundred and twenty-five milliseconds that relay coil will become de-energized, and solenoid coil 230 will become energized to sever a four-frame section of film— all as explained hereinbefore. Also, as explained hereinbefore, relay coil 238 will be disconnected from the conductor 80 and will become de-energized after a delay of about two hundred milliseconds, relay coils 188 and 212 will be energized, relay coil 238 will be energized and solenoid coil 230 will be de-energized, switch 242 will be closed momentarily, relay coil 250 will be energized, relay coil 168 will be de-energized, relay coil 106 will be energized, solenoid coil 182 will be re-energized to initiate a further cycle of operation thereof, relay coil 188 will be de-energized, relay coil 250 will become de-energized about two hundred milliseconds after it was energized, relay coil 170 will be connected to the conductor 80 and will become energized after about two and one quarter seconds, solenoid coil 182 will be de-energized, motor 260 will drive the pawl 18 until that pawl completes its fifth advancement and opens switch 202 as it comes to rest, relay coil 212 will be disconnected from conductor 80, after about one hundred and twenty-five milliseconds that relay coil will become de-energized, and solenoid coil 230 will become energized to sever a five-frame section of film. Moreover, as explained hereinbefore, relay coil 238 will be disconnected from the conductor 80 and will become de-energized after a delay of about two hundred milliseconds, relay coil 120 will be energized, relay coils 188 and 212 will be energized, relay coil 238 will be energized and solenoid coil 230 will be de-energized, switch 242 will be closed momentarily, relay coil 250 will be energized, relay coil 88 will be energized, relay coil 256 will be de-energized, the counter 124 will be actuated, relay coils 148 and 149 will be de-energized, relay coil 106 will be de-energized, relay coil 120 will be de-energized, reay coil 138 will be energized, relay coils 170 and 88 and 188 will be de-energized, and relay coil 250 will become de-energized.

This means that the control system of FIG. 2 advanced and severed two four-frame sections of film, advanced and severed a five-frame section of film, and then came to rest. It will be noted that in the case of the twelve-exposure roll of film, as well as in the case of the twenty-exposure film, the operator merely actuated the foot switch 150; and that the control system of FIG. 2 automatically sensed that the one roll of film was a twenty-exposure roll and automatically sensed that the second roll of film was a twelve-exposure roll. As a result, it is possible to splice twelve-exposure rolls of film and twenty-exposure rolls of film into overall, continuous rolls in random fashion, and yet have each of those rolls of film automatically subdivided into the correct number of four-frame and five-frame sections.

If, at any time while the control system of FIG. 2 is at rest, the operator of that control system wishes to actuate the knife 52 to sever the film 60, closing of pushbutton switch 218 will effect that actuation. Specifically, current will flow from conductor 80 via pushbutton switch 218, relay contacts 220, junction 228, and solenoid coil 230 to the conductor 82; and the resulting actuation of that solenoid coil will move the knife 52 downwardly and sever the portion of the film 60 in register with that knife. However, actuation of that pushbutton switch at any time while the control system of FIG. 2 is in operation will be ineffectual; because the relay coil 149 will be holding the relay contacts 220 open, and thus will keep the closing of that pushbutton switch from actuating the solenoid coil 230. As pointed out hereinbefore, relay coil 149 and relay contacts 220 provide a safety factor which obviates any undesired and inadvertent severance of any part of the film 60.

If, at any time while the control system of FIG. 2 is at rest, the operator of that control system wishes to effect one or more advancements of the film 60, closing of the pushbutton switch 172 will effect those advancements. Specifically, current will flow from conductor 80 via pushbutton switch 172, junction 180, and solenoid coil 182 to the conductor 82; and that solenoid coil will hold the dog 40 out of the path of the ear 34 on the clutch 32 as long as that solenoid coil is energized. This means that the motor 260 will continuously reciprocate the pawl 18, and thus provide successive advancements of the film 60, as long as the solenoid coil 182 is kept energized. When the operator of the control system of FIG. 2 releases the pushbutton 172, the solenoid coil 182 will become de-energized; but the motor 260 will continue to drive the pawl 18 until the ear 34 on the clutch 32 engages the dog 40 and halts further advancement of that pawl. At such time, the pawl 18 will be in its normal position and will be holding the switch 202 open; and the clutch 32 will slip to permit the motor 260 to continue to operate.

If, at any time during the operation of the control system of FIG. 2, the operator wishes to halt further operation of that control system, pressing of the pushbutton 84 will halt further operation. Specifically, closing of that pushbutton switch will energize relay coil 88; and, thereupon, relay contacts 122 will close, relay contacts 144 will open, and relay contacts 258 will close. The closing of relay contacts 122 will actuate the counter 124, and thus will not be particularly significant. However, the closing of relay contacts 258 will de-energize relay coil 256, and thus will effect re-opening of relay contacts 102. The opening of relay contacts 144 will de-energize both relay coils 148 and 149; and, thereupon, any of the relay coils 88, 106, 120, 168, 170, 188 and 250 which are not already de-energized will be de-energized. Also, any of the relay coils 138, 212 and 238 which are not energized will become energized.

Referring to FIG. 3, all of the numerals below 270, with the exception of numerals 88, 102, 148, 238 and 250, denote components which can be identical to the correspondingly-numbered components in FIGS. 1 and 2. The numeral 88 in FIG. 3 denotes a relay coil, as does the corresponding numeral in FIG. 2; but the relay coil 88 in FIG. 2 controls just the relay contacts 122, 144 and 258, whereas the relay coil 88 in FIG. 3 controls relay contacts 122 and 144, plus normally-closed relay contacts 282. The numeral 102 in FIG. 3 denotes relay contacts, as does the corresponding numeral in FIG. 2, but the relay contacts 102 in FIG. 3 are controlled by a relay coil 288. The numeral 148 in FIG. 3 denotes a relay coil, as does the corresponding numeral in FIG. 2; but the relay coil 148 in FIG. 2 controls just the relay contacts 90 and 108 whereas the relay coil 148 in FIG. 3 controls relay contacts 90, 108 and normally-open relay contacts 270. The numeral 238 in FIG. 3 denotes a relay coil, as does the corresponding numeral in FIG. 2; but the relay coil 238 in FIG. 2 controls just the relay contacts 114 and 184 whereas the relay coil 238 in FIG. 3 controls relay contacts 114, 184 and normally-closed relay contacts 292. The relay coil 250 in FIG. 3 denotes a relay coil, as does the corresponding numeral in FIG. 2; but the relay coil 250 in FIG. 2 controls just the relay contacts 94 and 154 whereas the relay coil 250 in FIG. 3 controls relay contacts 94, 154 and normally-open relay contacts 274.

The relay coil 288 and a relay coil 280 have the right-hand terminals thereof directly connected to the conductor 82; and the left-hand terminal of the relay coil 280 is connectable to the conductor 80 by the normally-open relay contacts 274 and a junction 276. A holding circuit for the relay coil 280 includes the normally-open relay contacts 270 and normally-open relay contacts 272 which are controlled by that relay coil. The relay coil 288 is connectable to the conductor 80 by normally-open relay contacts 290 which are conntrolled by relay coil 280, the normally-closed relay contacts 292, and a junction 286. A holding circuit for the relay coil 288 includes the normally-closed relay contacts 282 plus normally-open relay contacts 284 which are controlled by that relay coil. FIG. 3 does not show the amplifier unit 254 or the light-sensitive element 264 of FIG. 2, because the control system shown in FIG. 3 does not utilize a light-sensitive element.

The control system shown in FIG. 3 is usable with over-all, continuous rolls which include a number of twelve-exposure rolls of film that have indicia-bearing frames at the trailing ends thereof, and which have the indicia-bearing frames thereof spliced to the leading ends of the next-succeeding rolls of film. The operation of the control system of FIG. 3 will be initiated in the same way in which the operation of the control system of FIG. 2 is initiated. Specifically, the ON-OFF switch 78 will be closed; and, thereupon, the lamp 262 will be illuminated, the motor 260 will be energized, the knife-actuating solenoid 230 will experience a momentary energization, the relay coils 212, 188 and 138 will be energized, the knife-actuating solenoid 230 will be de-energized, the switch 242 will be closed momentarily during the returning movement of the knife 52, the relay coil 250 will be energized and then disconnected from the conductor 80, the relay coil 238 will be energized, and the relay coil 188 will be de-energized. All of this means that the relay coil 250 will become energized and will remain energized for about two hundred milliseconds and then become de-energized, the relay coils 138, 212 and 238 will become energized and will remain energized, and the solenoid coils 230 and the relay coil 188 will be energized only momentarily and will then again become energized. Also, the operator will re-set the counter 124 and then press the pushbutton switch 84 to effect de-energization of any relay coils which became energized but which should not be energized at the time the foot switch 150 is actuated.

At this time, the operator will place the leading portion of the film 60 on the upper surface of the translucent inspection plate 10, and will advance the leading edge of that film until it is in register with the knife 52. The operator will then momentarily close the foot switch 150; and relay coils 148 and 149 will become energized. Relay coil 149 will energize the solenoid coil 182 by closing the relay contacts 174; and that solenoid coil will enable the motor 260 to start reciprocating the pawl 18. Relay coil 149 also will disconnect relay coil 138 from the conductor 80 by opening relay contacts 126–128; but that relay coil will be kept energized for about two hundred milliseconds by current from the capacitor 140. The relay coil 148 will close relay contacts 90, 108 and 270; and the closing of the relay contacts 270 will pre-set a holding circuit for the relay coil 280. As the relay coil 138 becomes de-energized, it will permit relay contacts 160 to connect the relay coil 168 to the conductor 80. After about one and three-quarter seconds, the latter relay coil will open the relay contacts 176 to de-energize the solenoid coil 182. That solenoid coil will permit the dog 40 to move back into the path of the ear 34 on the clutch 32; but the motor 260 will continue to rotate that clutch, and thus will continue to drive the pawl 18, until that pawl reaches the end of the fourth advancement of the film 60 and opens the switch 202 and comes to rest.

As the switch 202 opens, it will disconnect relay coil 212 from the conductor 80, but that relay coil will be kept energized for about one hundred and twenty-five milliseconds by current from the capacitor 214. When that relay coil becomes sufficiently de-energized to permit the relay contacts controlled thereby to shift, the knife-actuating solenoid coil 230 will be energized and will cause the knife 52 to sever a section of the film 60. Because the relay coil 138 requires about two hundred milliseconds to become de-energized, and because the relay coil 168 requires about one and three quarter seconds to become fully energized, the severed section of the film 60 will have a length corresponding to four frames. As the relay coil 212 permitted the relay contacts controlled thereby to shift back to their normal positions, the relay coil 238 was disconnected from the conductor 80; but the capacitor 240 will supply sufficient current to the latter relay coil to keep it energized for about two hundred milliseconds. When relay coil 238 becomes sufficient de-energized to permit the relay contacts controlled thereby to return to their normal positions, it will permit the relay contacts 292, as well as the relay contacts 114 and 184, to re-close; and the relay contacts 292 will pre-set an energization circuit for the relay coil 288.

Relay coils 188 and 212 will become energized in succession as the relay coil 238 becomes de-energized; and then, as the knife-actuating solenoid coil 230 becomes de-energized, the relay coil 238 will be re-energized. Switch 242 will close momentarily as the knife 52 moves back upwardly to its normal position, and, thereupon, the relay coil 250 will become energized. That relay coil will close relay contacts 274 as it closes relay contacts 94 and opens relay contacts 154; and the closing of relay contacts 274 will permit current to flow from conductor 80 via those relay contacts, junction 276 and relay coil 280 to the conductor 82. The resulting energization of relay coil 280 will close relay contacts 272 and 290; and relay contacts 272 will complete a holding circuit for that relay coil via conductor 80, relay contacts 270, relay contacts 272, junction 276 and that relay coil to the conductor 82, while the closing of relay contacts 290 will pre-set the energization circuit for the relay coil 288.

As the relay coil 250 became energized, it de-energized relay coil 168; and the resulting re-closing of relay contacts 176 re-energized the solenoid coil 182. This means that the motor 260 and the pawl 18 initiated a second set of advancements of the film 60. Also as the relay coil 168 became de-energized, the relay coil 188 became de-energized because of the re-opening of the relay contacts 190–192.

About two hundred milliseconds after the relay coil 250 was energized, that relay coil will become de-energized; and the relay contacts controlled by that relay coil will return to their normal positions. The resulting re-opening of relay contacts 274 will not be significant, because the holding circuit which includes relay contacts 270 and 272 will keep relay coil 280 energized. As the relay coil 250 becomes de-energized, the relay coil 168 will be re-connected to the conductor 80; but that relay coil will not become energized for a period of about one and three quarters seconds. When that relay coil does become energized, it will again de-energize solenoid coil 182; but the motor 260 will continue to drive the pawl 18 until that pawl completes the fourth advancement of the film 60, re-opens the switch 202, and comes to rest. The re-opening of that switch will disconnect relay coil 212 from the conductor 80; but the capacitor 214 will continue to hold that relay coil energized for about one hundred and twenty-five milliseconds. Thereafter, that relay coil will energize solenoid coil 230 to cause the knife 52 to sever a second four-frame section of the film 60; and it will disconnect relay coil 238 from the conductor 80. The capacitor 240 will keep relay coil 238 energized for about two hundred milliseconds; but thereafter relay contacts 292 will re-close and energize relay coil 288 via conductor 80, relay contacts 290, relay contacts 292, junction 286, and that relay coil to the conductor 82. The closing of relay contacts 284 will establish a holding circuit for relay coil 288 via conductor 80, relay contacts 282, relay contacts 284, junction 286, and that relay coil to the conductor 82; but the closing of relay contacts 102 will not energize relay coil 106 because relay contacts 94 are open. The re-closing of relay contacts 184, as relay 238 becomes de-energized, will energize relay coil 188; and the resulting closing of relay contacts 216 will re-energize relay coil 212—with a consequent re-energization of relay coil 238 and a consequent de-energization of the knife-actuating solenoid coil 230. The switch 242 will close momentarily, as the knife 52 moves back up to its normal position ;and, thereupon, the relay coil 250 will be energized to disconnect relay coil 168 from the conductor 80 and to energize relay coil 106 via conductor 80, relay contacts 94, relay contacts 96–100, relay contacts 102, junction 104, and that relay coil to the conductor 82. As relay coil 106 becomes energized, it will close relay contacts 92, 112 and 162–166 and will open relay contacts 162–164. The closing of relay contacts 92 will establish a holding circuit for the relay coil 106, the closing of relay contacts 112 will pre-set the energization circuit for the relay coil 120, the opening of relay contacts 162–164 will prevent re-energization of the relay coil 168, and the closing of relay contacts 162–166 will pre-set the energization circuit for the relay coil 170. The de-energization of the relay coil 168, as the relay contacts 154 re-opened when relay coil 250 became energized, re-closed the relay contacts 176 and thus re-energized the solenoid 182; thereby initiating a third energization cycle of that solenoid coil. That de-energization of relay coil 168 also opened relay contacts 190–192, thereby de-energizing relay coil 188, and additionally closed relay contacts 190–194, thereby keeping relay coil 212 energized via conductor 80, relay contacts 190–194, relay contacts 196–200, junction 204, diode 206, junction 208, and that relay coil to the conductor 82. As relay coil 188 became de-energized, relay contacts 201 and 216 re-opened; but the re-opening of those relay contacts was not significant at that time.

The control circuit of FIG. 3 will enable the motor 260 to continue to reciprocate the pawl 18 during the two hundred millisecond period when the capacitor 252 is causing sufficient current to flow through the relay coil 250 to hold the relay contacts 94 and 274 closed and to hold the relay contacts 154 open. Further, that motor will continue to reciprocate that pawl after the relay coil 250 has become de-energized and has permitted relay contacts 94 and 274 to re-open and relay contacts 154 to re-close; because the re-opening of relay contacts 94 can not affect the holding circuit for relay coil 106 which includes the relay contacts 90 and 92 and junction 104, and because the relay coil 170 will not shift its relay contacts for about two and one-quarter seconds after that relay coil is connected to the conductor 80 at the time the relay contacts 154 re-close. This means that relay coil 170 will not become sufficiently energized to shift its relay contacts until after the pawl 18 has completed a fourth advancement of the film 60 and has initiated a fifth advancement of that film.

As the relay coil 170 does become energized, the relay contacts 178 will open to de-energize the solenoid coil 182; and that solenoid coil will again permit the dog 40 to move into the path of the ear 34 on the clutch 32. However, that clutch will permit the motor 260 to continue to drive the pawl 18 until that pawl completes the fifth advancement of the film 60; and that pawl will re-open the switch 202 and will come to rest as it completes that fifth advancement. The opening of the relay contacts 196–200, as the relay coil 170 becomes energized, will leave the switch 202 as the sole current-supplying element for the relay coil 212; and hence, when that switch opens as the pawl 18 completes its fifth advancement, the latter relay coil will be disconnected from the conductor 80. However, the capacitor 214 will discharge through that relay coil and will cause sufficient current to flow through that relay coil for about one hundred and twenty-five milliseconds to keep the relay contacts controlled by that relay coil from shifting. The closing of the relay contacts 196–198, as the relay coil 170 becomes energized, will pre-set a holding circuit for the relay coil 188.

The re-closing of the relay contacts 222–224, as the relay coil 212 becomes de-energized, will energize the solenoid coil 230 and will cause the knife 52 to move downwardly and sever a third section of the film 60. That section will not only include four exposure-bearing frames but will also include a fifth frame that is blank and that has an indicia and one-half of a light-opaque splice thereon. That section plus the two previously-severed four-frame sections will be packaged with the prints made therefrom and will be held for the owner thereof.

The de-energization of relay coil 212 also will disconnect relay coil 238 from the conductor 80; and, after about two hundred milliseconds, the latter relay coil will become de-energized and will permit relay contacts 292 as well as relay contacts 114 and 184 to re-close. The re-closing of relay contacts 114 will energize relay coil 120; and the re-closing of relay contacts 184 will energize relay coil 188. As pointed out hereinbefore, in connection with the operation of the control system of FIG. 2, relay coil 212 will then become energized and will de-energize solenoid coil 230 while energizing relay coil 238. The energization of relay coil 238 will re-open relay contact 292 as well as relay contacts 114 and 184.

The switch 242 will close momentarily as the knife 52 moves back up to its normal position; and, thereupon, relay coil 250 will become energized and will close relay contact 94 to energize relay coil 88. Relay coil 88 will close relay contacts 122 but will open relay contacts 144 and 282; and the opening of relay contacts 144 will de-energize relay coils 148 and 149, and the opening of relay contacts 282 will de-energize relay coil 288.

Subsequently, relay coils 106, 120 and 280 will become de-energized, relay coil 138 will become energized, and relay coils 170, 88, 188 and 250 will become de-energized. This means that the control system of FIG. 3 will have responded to actuation of the foot switch 150 to automatically provide the advancement and severance of two four-frame sections of the film 60 plus an advancement and severance of a five-frame section of that film. That control system will come to rest with relay coils 138, 212 and 238 energized and with the rest of the relay coils thereof de-energized. That control system will then be ready to effect further advancements and severances of two four-frame sections of the film 60 followed by advancements and severances of single five-frame sections of that film.

Where the control system of FIG. 2 is intended to subdivide a twelve-exposure roll of film into two four-frame sections and one five-frame section, the light-sensitive element 264 will be spaced from the knife 52 a distance greater than the length of a five-frame section but less than the length of a six-frame section of the film 60. If it ever became desirable to modify the control system of FIG. 2 to enable it to subdivide a twelve-exposure roll of film into five two-frame sections plus a three-frame section, the knob on the relay coil 168 would be adjusted to enable that relay coil to become energized about fifty-five hundredths of a second after it was connected to the conductor 80, the knob on the relay coil 170 would be adjusted to enable that relay coil to become energized about one second and fifty milliseconds after it was connected to the conductor 80, and the opening 12 and the light-sensitive element 264 would be shifted to the left in FIG. 1. That opening and that light-sensitive element would have to be spaced from the knife 52 a distance greater than the length of a three-frame section but less than the length of a four-frame section of the film 60. If the control system of FIG. 2 was modified in that way, it would respond to an actuation of the foot switch 150 to provide a succession of advancements and severances of two-frame sections of the film 60 until the light-sensitive element 264 "saw" a light-opaque splice; and then that control system would complete the advancement and severance of the two-frame section which was approaching the knife 52 as that light-sensitive element "saw" that light-opaque splice, and then would advance and sever a three-frame section and come to rest. If that control system was modified in that way, it would also be able to respond to an actuation of the foot switch 150 to subdivide a twenty-exposure roll of film into nine two-frame sections plus a three-frame section.

If it ever became desirable to modify the control system of FIG. 2 to enable it to subdivide a twelve-exposure roll of film into six two-frame sections plus a single-frame indicia-bearing section, the knob on the relay coil 168 would be adjusted to enable the relay coil to become energized about fifty-five hundredths of a second after it was connected to the conductor 80, the knob on the relay coil 170 would be adjusted to enable that relay coil to become energized about fifty milliseconds after it was connected to the conductor 80, and the opening 12 and the light-sensitive element 264 would be shifted to the left in FIG. 1. That opening and that light-sensitive element would have to be spaced from the knife 52 a distance greater than the length of a single-frame section but less than the length of a two-frame section of the film 60. If the control system of FIG. 2 was modified in that way, it would respond to an actuation of the foot switch 150 to provide five full advancements and severances of two-frame sections of the film 60 and would initiate and partially complete an advancement of a sixth two-frame section before the light-sensitive element 264 "saw" a light-opaque splice. As that light-sensitive element "saw" that light-opaque splice, it would enable that control system to complete the sixth two-frame advancement of the film 60 and to effect the severance of the sixth two-frame section. Thereafter that control system would energize the relay coil 170 rather than the relay coil 168, so the ensuing re-energization of the solenoid coil 182 would produce just a single-frame advancement of the film 60 and so the ensuing actuation of the knife 52 would sever that single frame. If that control system was modified in that way, it would also be able to respond to an actuation of the foot switch 150 to subdivide a twenty-exposure roll of film into ten two-frame sections plus a single-frame, indicia-bearing section.

If it ever became desirable to modify the control system of FIG. 2 to enable it to subdivide a twelve-exposure roll of film into three four-frame sections plus a single-frame, indicia-bearing section, the knob on the relay coil 170 would be adjusted to enable that relay coil to become energized about fifty milliseconds after it was connected to the conductor 80, and the opening 12 and the light-sensitive element 264 would be shifted to the left in FIG. 1. That opening and that light-sensitive element would have to be spaced from the knife 52 a distance greater than the length of a three-frame section but less than the length of a four-frame section of the film 60. If the control system of FIG. 2 was modified in that way, it would respond to an actuation of the foot switch 150 to provide two full advancements and severances of four-frame sections of the film 60 and would initiate and partially complete the advancement of a third four-frame section before the light-sensitive element 264 "saw" a light-opaque splice. As that light-sensitive element "saw" that light-opaque splice, it would enable that control system to complete the third four-frame advancement of the film 60 and to effect the severance of the third four-frame section. Thereafter, that control system would energize the relay coil 170 rather than the relay coil 168, so the ensuing re-energization of the solenoid coil 182 would produce just a single-frame advancement of the film 60 and so the ensuing actuation of the knife 52 would sever that single frame. If that control system was modified in that way, it would also be able to respond to an actuation of the foot switch 150 to subdivide a twenty-exposure roll of film into five four-frame sections plus a single-frame, indicia-bearing section.

If it ever became desirable to modify the control system of FIG. 3 to enable it to subdivide a twelve-exposure roll of film into three four-frame sections plus an indicia-bearing section, the knob on the relay coil 170 would be adjusted to enable that relay coil to become energized about fifty milliseconds after it was connected to the conductor 80, and two additional relay coils would be added. One of those additional relay coils would be equipped with two diodes and a capacitor, in the manner in which relay coils 138, 238 and 250 are so equipped, to enable it to remain energized for about two hundred milliseconds after it was disconnected from the conductor 80, it would be connectable to that conductor by normally-closed relay contacts which would be controlled by the relay coil 288, and it would control normally-closed relay contacts in the energization circuit of the other of the additional relay coils. Relay coil 238 would be equipped with an additional set of normally-closed relay contacts; and those relay contacts would also be in the energization circuit of the other of those additional relay coils. The relay coil 88 would be equipped with an additional set of normally-closed relay contacts; and those relay contacts would be connected in series with a set of normally-open relay contacts controlled by the other of the additional relay coils to constitute a holding circuit for that other additional relay coil. The relay contacts 102 would be actuated by that other additional relay coil rather than by the relay coil 288, as in FIG. 3.

In the modified, as well as in the un-modified, control system of FIG. 3, the relay coils 280 and 288 are normally deenergized; and hence, in that modified control system, the additional slow-to-release relay coil will normally be energized and will normally keep the other of the additional relay coils de-energized. In that modified, as well as in that un-modified, control system the relay coil 280 will become energized as the knife 52 moves upwardly after severing the first four-frame section of the film 60 and causes the switch 242 to energize the relay coil 250. In that modified, as well as in that un-modified, control system the relay coil 288 will become energized as the relay coil 238 becomes de-energized after the second four-frame section has been severed; but the relay contacts 102 will remain open because those relay contacts will be controlled by the other of the additional relay coils rather than by the relay coil 288. As the relay coil 288 becomes energized, it will open the relay contacts in the energizing circuit of the additional slow-to-release relay coil, and thus will disconnect that additional slow-to-release relay coil from the conductor 80; but that additional slow-to-release relay coil will not become de-energized for about two hundred milliseconds.

In the modification of the control system of FIG. 3, the relay coils 188, 212 and 238 will become energized; and the energization of relay coil 238 will keep the other of the additional relay coils de-energized by opening the relay contacts, controlled by relay coil 238, in the energizing circuit of that other additional relay coil. This means that when the additional slow-to-release relay coil does become de-energized, the re-closing of the relay contacts which are controlled by that relay coil and which are in the energizing circuit of the other additional relay coil will not energize that other additional relay coil. Prior to the de-energization of the additional slow-to-release relay coil, the solenoid coil 230 will be de-energized, the switch 242 will close momentarily and then re-open, the relay coil 250 will be energized and then disconnected from the conductor 80, the relay coil 168 will be de-energized, the solenoid 182 will be re-energized to initiate further advancements of the film 60, and relay coil 188 will be de-energized. During those further advancements, the additional slow-to-release relay coil will become de-energized to permit the relay contacts which are controlled by that relay coil and which are in the energizing circuit of the other additional relay coil to re-close; but that other additional relay coil will be kept de-energized by the contacts which are in the energizing circuit thereof and which the relay coil 238 is holding open.

The relay coil 250 will become de-energized, and relay coil 168 will be connected to conductor 80; and one and fifty-five hundreths seconds after the latter relay coil has been so connected it will shift the relay contacts controlled by it to de-energize solenoid coil 182. Thereafter, as the pawl 18 completes the fourth advancement of the film 60, that pawl will re-open the switch 202. Relay coil 212 will then be disconnected from the conductor 80; and, about one and one-quarter seconds later, that relay coil will become de-energized to energize solenoid coil 230 and to disconnect relay coil 238 from the conductor 80. The energization of the solenoid coil 230 will cause the knife 52 to move downwardly and sever the third four-frame section of the film 60. About two hundred milliseconds after relay coil 238 was disconnected from the conductor 80, that relay coil will become de-energized; and, thereupon, the relay contacts which are controlled by that relay coil and which are in the energizing circuit of the other additional relay coil will re-close, and that other additional relay coil will become energized. Thereupon, a holding circuit will be completed for that other additional relay coil via conductor 80, the normally-closed relay contacts controlled by the relay coil 88, the normally-open relay contacts controlled by that other additional relay coil, and that other additional relay coil to the conductor 82. As that other additional relay coil becomes energized, it will close the relay contacts 102 and will hold those relay contacts closed. The closing of the relay contacts 102 will not, however, energize the relay coil 106; because the relay contacts 94 will be open.

As the relay coil 238 became de-energized it re-energized the relay coil 188, and the latter relay coil re-energized the relay coil 212. As the relay coil 212 becomes energized, it will re-energize the relay coil 238 and will de-energize the solenoid coil 230. The re-energization of the relay coil 238 will not de-energize the other additional relay coil of the modification of the control system of FIG. 3, because that other additional relay coil will be held energized by its holding circuit. As the knife 52 moves upwardly after the de-energization of the solenoid coil 230, the switch 242 will close momentarily and re-open; and the closing of that switch will energize the relay coil 250. The resulting closing of relay contacts 94 will energize the relay coil 106; thereby disconnecting relay coil 168 from the relay contacts 154 and connecting relay coil 170 to those relay contacts. The relay contacts 92 will be closed by relay coil 16 to establish a holding circuit for that relay coil. The de-energization of relay coil 168 will re-energize the solenoid coil 182 and will thus initiate a further advancement of the film 60; and the de-energization of that relay coil also will de-energize the relay coil 188.

Subsequently, when the relay coil 250 becomes de-energized, relay contacts 154 will re-close and will connect relay coil 170 to the conductor 80 via relay contacts 126–130, junctions 142 and 152, relay contacts 154, junction 158, relay contacts 160, relay contacts 162–166, and that relay coil. About fifty milliseconds after the relay coil 170 is connected to the conductor 80, that relay coil will become energized and will open relay contacts 178 to de-energize the solenoid coil 182 and thereby move the dog 40 out of the path of the ear 34 on the clutch 32. The motor 260 will continue to rotate that clutch until the pawl 18 completes the single advancement of the film 60 which was initiated by the energization of solenoid coil 182 as the relay coil 168 became de-energized. As that pawl completes that single advancement of the film 60, it will re-open the switch 202; and, thereupon, the relay coil 212 will be disconnected from conductor 80. About one and one quarter seconds thereafter, that relay coil will become de-energized, thereby energizing the solenoid coil 230 and disconnecting the relay coil 238 from the conductor 80. About two hundred milliseconds after the relay coil 238 is disconnected from the conductor 80, the relay coil 120 will be energized; and then relay coil 188 and relay coil 212 will become energized, solenoid coil 230 will become de-energized and relay coil 238 will become energized, switch 242 will close and then open as the knife 52 moves back upwardly, and relay coil 250 will be energized. Relay coil 88 will be energized with a consequent actuation of counter 124 and with consequent de-energization of all of the relay coils other than relay coils 138, 212, 238 and the additional slow-to-release relay coil.

All of this means that the modification of the control system of FIG. 3 initiated and completed three four-frame advancements of the film 60 and then automatically initiated and completed a single-frame advancement of that film. Thereafter, that modification of that control system came to rest in condition to automatically subdivide a further twelve-exposure roll into three four-frame sections plus a single-frame indicia-bearing section.

If desired, the control system of FIG. 3 could readily be modified to enable it to automatically subdivide a twelve-exposure roll of film into six two-frame sections plus a single-frame, indicia-bearing section. Similarly, if desired, that control system could readily be modified to enable it to automatically subdivide a twenty-exposure roll of film into four four-frame sections plus a five-frame section which includes the indicia-bearing frame, could readily be modified to enable it to automatically sub- divide such a roll of film into five four-frame sections plus a single-frame, indicia-bearing section, could readily be modified to enable it to automatically subdivide such a roll of film into ten two-frame sections plus a single-frame, indicia-bearing section, could readily be modified to enable it to automatically subdivide a twelve-exposure roll of film into five two-frame sections plus a three-frame indicia-bearing section or could readily be modified to enable it to automatically subdivide a twenty-exposure roll of film into nine two-frame sections plus a three-frame indicia-bearing section.

In view of the foregoing, it should be apparent that the control systems of FIGS. 2 and 3 are quite useful and quite versatile, and that those control systems are readily adaptable to the needs of all different kinds of users. The control system of FIG. 2 advances and severs fixed-length sections of the film 60 until the light-sensitive element 264 "sees" a light-opaque splice, it completes the advancement and severance of the section during which that light-sensitive element "sees" that splice, it advances and severs the section which includes the indicia-bearing frame, and then it comes to rest. That control system will repeat that cycle of operation whenever the operator actuates the foot switch 150; and that control system will correctly subdivide the various rolls of film in the overall, continuous roll, whether those rolls of film have twelve or twenty exposures. The control system of FIG. 3 advances and severs fixed-length sections of the film 60, and it energizes and holds a relay coil each time a fixed-length section has been advanced and severed; and, after a predetermined number of fixed-length sections have been advanced and severed, it will advance and sever the section which includes the indicia-bearing frame. While the control system of FIG. 3 can only subdivide rolls of film which have equal numbers of exposures, that control system can readily be modified to provide the desired number of frames per section and to cut the desired length of film roll.

The Byers Film Cutter Model 126 was selected as the cutter to be used with the control system provided by the present invention, because it required only a minimum amount of modification to enable it to be operated by that control system. Specifically, only the following changes had to be made in that film cutter to enable it to be incorporated in that control system; the manually-operated starting switch assembly was removed, a four terminal strip was replaced by a ten terminal strip, the switch 202 was added, the upper plastic film guide was raised about twenty thousandths of an inch by shims to provide room for the splices which interconnect the adjacent rolls of film to form an overall, continuous roll, the spring tension on the film pressure roller arm was relieved by deepening the socket for the spring which provides that tension, a large washer was placed under the screw which holds the knife-returning spring to provide a better mechanical holding and to increase the knife-returning force, the opening 12 was formed in the translucent inspection plate 10, the light pipe 16 was added, the light-sensitive element 264 was added, the diameter of part of the guiding pin adjacent the free end of the pawl 18 was reduced to permit that pawl to move downwardly into the openings at the side of the film 60 despite the raising of the upper film guide by shims, a bracket was added to rotatably support the film reel 58, a plexiglass trough was added to guide the cut-off sections of film, and the translucent inspection plate 10 was fixed against longitudinal shifting so the opening 12 therein would remain in register with the light pipe 16. If desired, however, another film cutter could be substituted for the Byers Film Cutter Model 126.

In the preferred embodiments of the control system shown in FIGS. 1–3, each indicia-bearing frame has exactly the same length as an exposure-bearing frame. Further, the various rolls of film are pre-cut so the knife 52 will cut the spaces between adjacent exposure-bearing frames and will cut the spaces between exposure-bearing frames and adjacent indicia-bearing frames rather than cut into the exposures on the exposure-bearing frames. The indicia can be attached to the upper or lower surfaces of the indicia-bearing frames, and the light-opaque splices can be affixed to the upper or lower surfaces of the rolls of film. The splices should be so located that they will not overlap or obscure the indicia.

Whenever the operator closes and then releases the push-button switch 218—to effect energization and de-energization of the knife-actuating solenoid coil 230—the knife 52 will sever the film 60 and then will momentarily close the switch 242. The relay coil 250 will be energized whenever that switch is closed; but that energization will not be significant because the relay coil will become de-energized about two hundred milliseconds thereafter.

The control systems of FIGS. 2 and 3 utilize relays which control relay contacts. If desired, however, various components of those control systems can be replaced by solid-state switching devices.

If the counter 124 required more than about twenty milliseconds to register a count, the normally-open relay contacts 122 could be eliminated and the left-hand terminal of that counter could be connected to a normally-open relay contact adjacent the normally-closed relay contacts 178. Those normally-open relay contacts would close as the relay coil 170 became energized, and those relay contacts would remain closed as long as that relay coil remain closed—thereby giving even a slow-acting counter sufficient time to register a count.

Whereas the drawing and accompanying description have shown and described two preferred embodiments of the present invention, it should be apparent to those skilled in the art that various changes may be made in the form of the invention without affecting the scope thereof.

What I claim is:

1. A control system, for a film cutter that includes a film-advancing mechanism and a knife to sever frame bearing film, which comprises:
   a starting switch,
   a circuit which can actuate said film-advancing mechanism to provide a predetermined advancement of film and can then cause said knife to sever the advanced section of film,
   a second circuit which can actuate said film-advancing mechanism to provide a second and different predetermined advancement of film and can then cause said knife to sever the advanced section of film,
   a transfer circuit that normally permits activation of the first said circuit and then acts to prevent further activation of said first said circuit while permitting activation of said second circuit, and
   a standby circuit that then prevents further activation of said first said or said second circuit until after said starting switch has been actuated.

2. A control system as claimed in claim 1 wherein the first said circuit includes a timing element which helps determine the first said predetermined advancement, wherein said second circuit includes a second timing element which helps determine said second predetermined advancement, and wherein said timing elements have time cycles of different lengths.

3. A control system as claimed in claim 1 wherein the first said circuit has an element which helps make the first said predetermined advancement be four frames, and wherein said second circuit has a second element which helps make said second predetermined advancement be five frames.

4. A control system as claimed in claim 1 wherein the first said circuit has a timing element, and wherein said second circuit has a second timing element, the first said timing element helping make the first said predetermined advancement be four frames, said second timing element helping make said second predetermined advancement be one frame.

5. A control system as claimed in claim 1 wherein said starting switch initiates the first cycle of operation of the first said circuit, and wherein any further cycle of operation of the first said circuit is initiated automatically.

6. A control system as claimed in claim 1 wherein said transfer circuit includes a light-sensitive element that is actuated when it "sees" a light-opaque splice.

7. A control system as claimed in claim 1 wherein said transfer circuit includes a light-sensitive element that is actuated when it "sees" a light-opaque splice, and wherein said light-sensitive element is disposed ahead of said knife so said light-sensitive elements will "see" said light-opaque splice before said knife severs the section of film containing said light-opaque splice.

8. A control system as claimed in claim 1 wherein said transfer circuit includes a light-sensitive element that is actuated when it "sees" a light-opaque splice, and wherein said light-sensitive element is disposed ahead of said knife so said light-sensitive elements will "see" said light-opaque splice before said knife severs the section of film containing said light-opaque splice, said light-sensitive element being spaced ahead of said knife a distance greater than the distance corresponding to the first said predetermined advancement where said second predetermined advancement is greater than said first said predetermined advancement.

9. A control system as claimed in claim 1 wherein said transfer circuit includes a light-sensitive element that is actuated when it "sees" a light-opaque splice, and wherein said light-sensitive element is spaced ahead of said knife a distance less than the distance corresponding to the first said predetermined advancement where said second predetermined advancement is less than said first said predetermined advancement.

10. A control system as claimed in claim 1 wherein said transfer circuit includes a light-sensitive element that is actuated when it "sees" a light-opaque splice, and wherein said light-sensitive element is disposed ahead of said knife so said light-senstive elements will "see" said light-opaque splice before said knife severs the section of film containing said light-opaque splice, said light-sensitive element being spaced ahead of said knife a distance greater than the length of a five-frame section of film where the first said predetermined advancement is four frames and said second predetermined advancement is five frames.

11. A control system as claimed in claim 1 wherein said transfer circuit includes a light-sensitive element that is actuated when it "sees" a light-opaque splice, and wherein said light-sensitive element is spaced ahead of said knife a distance greater than the length of a three-frame section of film but less than the length of a four-frame section of film where the first said predetermined advancement is four frames and said second predetermined advancement is one frame.

12. A control system as claimed in claim 1 wherein said transfer circuit includes a light-sensitive element that is actuated when it "sees" a light-opaque splice, said transfer circuit permitting the length of the film advancement during which said light-sensitive element "sees" said light-opaque splice to equal the length of the immediately-preceding film advancement, said transfer circuit making the length of the next-succeeding film advancement correspond to the length of said second predetermined advancement of film.

13. A control system as claimed in claim 1 wherein said transfer circuit pre-sets said second circuit, and wherein a switch that responds to movement of said knife effects the initiation of the operation of said second circuit.

14. A control system as claimed in claim 1 wherein said starting switch effects the initiation of the first operation of the first said circuit, and wherein a switch that responds to movement of said knife effects the initiation of the subsequent operations of the first said circuit.

15. A control system as claimed in claim 1 wherein the first said circuit has an element which provides a time delay between the completion of the first said predetermined advancement of film and the actuation of said knife.

16. A control system as claimed in claim 1 wherein the first said circuit has an element which provides a time delay between the completion of the first said predetermined advancement of film and the actuation of said knife, and wherein said second circuit has an element which provides a time delay between the completion of said second predetermined advancement of film and the actuation of said knife.

17. A control system as claimed in claim 1 wherein said second circuit pre-sets said standby circuit, and wherein a switch that responds to movement of said knife effects the initiation of the operation of said standby circuit.

18. A control system as claimed in claim 1 wherein said transfer circuit includes elements that count the number of operations of the first said circuit and that cause said transfer circuit to activate said second circuit whenever said number of operations reaches a predetermined value.

19. A control system as claimed in claim 1 wherein a manually-operated switch is adapted to effect actuation of said knife to sever film, and wherein a safety circuit keeps said manually-operated switch from effecting actuation of said knife during the operation of the first said or said second circuits.

20. A control system as claimed in claim 1 wherein said transfer circuit includes a light-sensitive element that is actuated only when it fails to "see" light, said transfer circuit permitting the first said circuit to repetitively provide said predetermined advancement of film until said light-sensitive element "sees" a light-opaque splice, whereby rolls of different length can be automatically subdivided into sections.

21. A control system, for a film cutter that includes a film-advancing mechanism and a knife to sever film, which comprises:
a selectively-operated switch to initiate operation of said film-advancing mechanism,
means to continue the operation of said film-advancing mechanism until said film has been advanced a predetermined distance, and to then permit said film to come to rest,
knife-actuating means to actuate said knife to sever a section of said film,
switch means, operated as said knife moves, to initiate a further operation of said film-advancing mechanism, the first said means continuing the further operation of said film-advancing mechanism until said film has been advanced a distance equal to said predetermined distance, and then permitting said film to come to rest,
said knife-actuating means then actuating said knife to sever a further section of said film,
said switch means operating as said knife moves to initiate a still further operation of said film-advancing mechanism, and
further means to continue the operation of said film-advancing mechanism until said film has been advanced a second and different predetermined distance, and to then permit said film to come to rest,
said knife-actuating means then actuating said knife to sever a still further section of film,
said switch means operating as said knife moves to cause said control system to come to rest in preparation for a further actuation of said selectively-operated switch,
whereby said control system will advance and sever a plurality of equi-length sections of film, will advance and sever a section of film of different length, and will then come to rest.

22. The method of automatically subdividing a roll of film into a number of equi-length sections plus a section of different length which comprises advancing said film a predetermined distance and then severing said film, subsequently advancing said film a predetermined number of times through said predetermined distance and severing said film at the end of each advancement through said predetermined distance, and thereafter advancing said film a different predetermined distance and severing said film at the end of said advancement of said different predetermined distance.

References Cited
UNITED STATES PATENTS

| | | | |
|---|---|---|---|
| 2,779,408 | 1/1957 | Miller et al. | 83—234 X |
| 2,815,075 | 12/1957 | Braunstein et al. | 83—212 |
| 2,838,113 | 6/1958 | Cornell | 83—209 |
| 3,145,649 | 8/1964 | Bagsner | 83—212 X |
| 3,174,374 | 3/1965 | Wick et al. | 83—210 |
| 3,270,599 | 9/1966 | Kleist | 83—209 X |

WILLIAM S. LAWSON, Primary Examiner

U.S. Cl. X.R.

83—210, 211, 234, 242